April 26, 1960 C. M. MOSER 2,934,184
FASTENER AND CLOSURE DEVICE
Filed Nov. 19, 1957 2 Sheets-Sheet 1
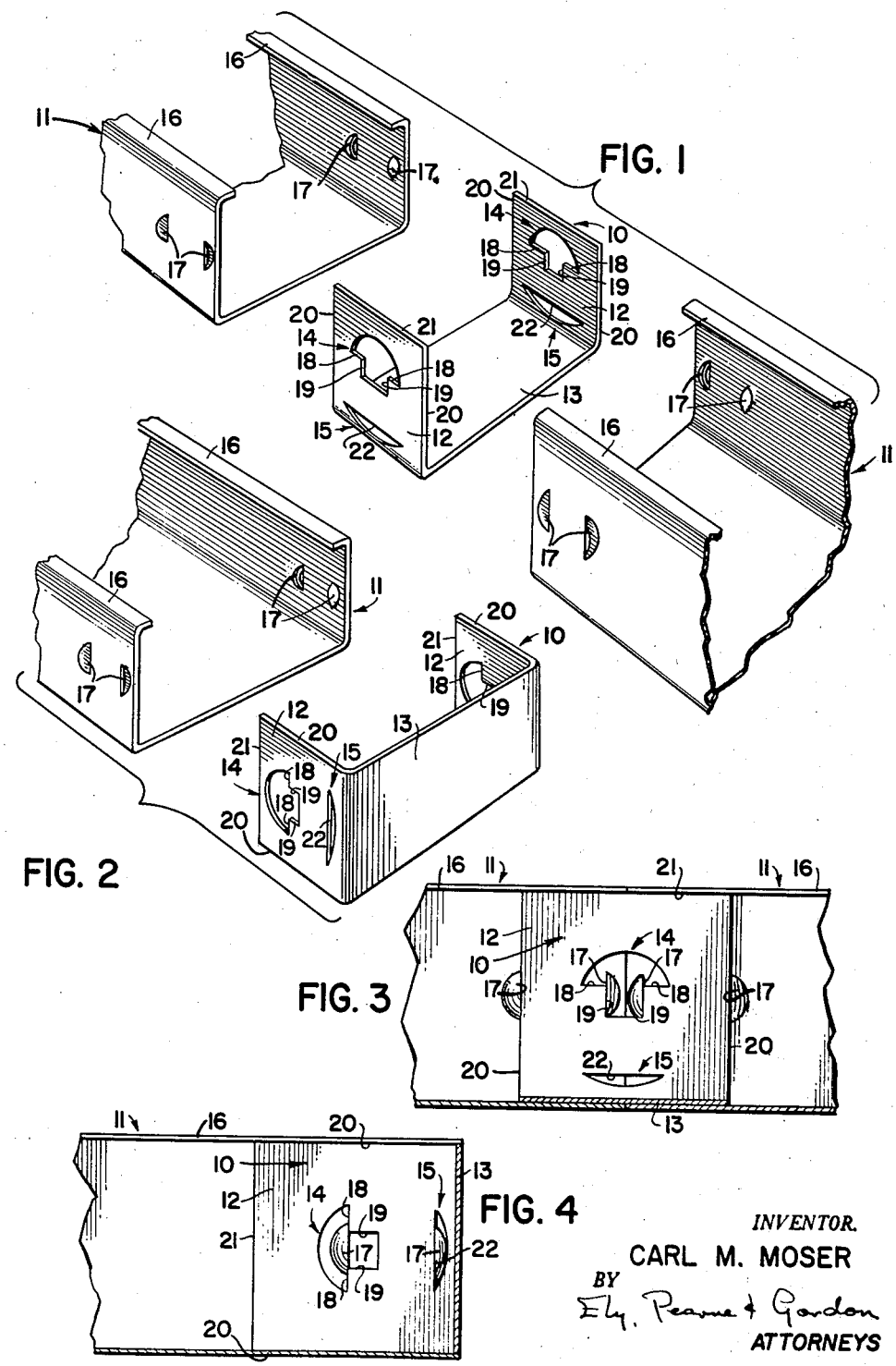
INVENTOR.
CARL M. MOSER
BY Ely, Pearne & Gordon
ATTORNEYS April 26, 1960
C. M. MOSER
2,934,184
FASTENER AND CLOSURE DEVICE
Filed Nov. 19, 1957
2 Sheets-Sheet 2
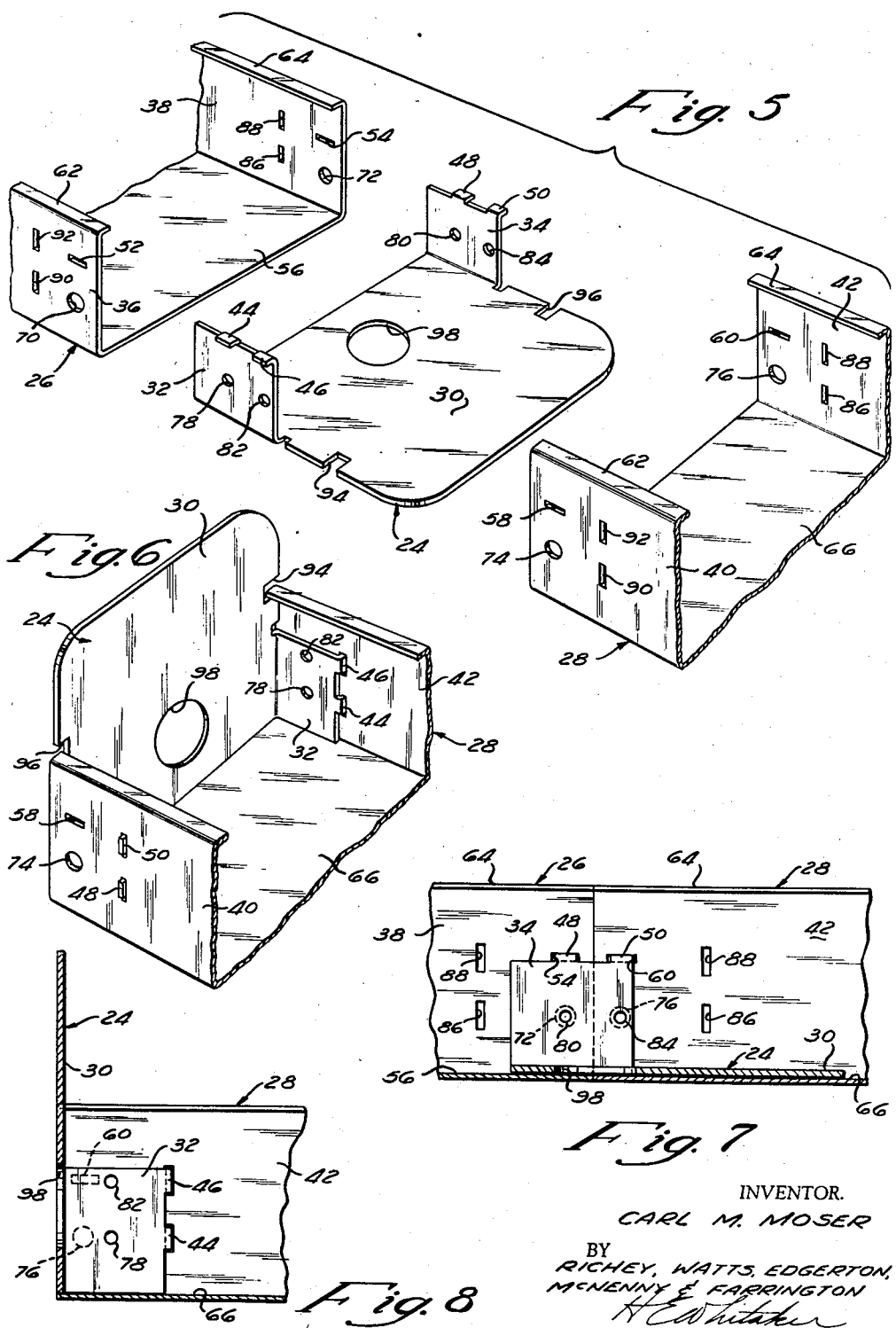
INVENTOR.
CARL M. MOSER
BY
RICHEY, WATTS, EDGERTON,
McNENNY & FARRINGTON
ATTORNEYS

United States Patent Office 2,934,184
Patented Apr. 26, 1960

2,934,184

FASTENER AND CLOSURE DEVICE

Carl M. Moser, Cleveland, Ohio, assignor to John C. Virden Company, Cleveland, Ohio, a corporation of Ohio Application November 19, 1957, Serial No. 697,764

8 Claims. (Cl. 189—36)

This invention relates to a fastener and closure particularly adapted for the final assembly of modular housing channel units and similar modular elements and is a continuation-in-part of my copending application for Fastener and Closure Device Serial No. 520,839, filed July 8, 1955 and now abandoned.

An object of the invention is to provide a single simple element which may interchangeably function as the end closure of a channel or as the spline fastening between the ends of two aligned channels. Thus, through the provision in quantity of this single fastener and closure element, together with a single standard channel body, it becomes possible to assemble a variety of lengths of housings which are open throughout their interior lengths but which are suitably closed at their ends. This is accomplished through the provision of multiple pairs of oppositely facing edges of detent abutments on U-shaped fastener elements, which pairs of abutments are adapted to engage with pairs of lances or other suitable pairs of detent abutments provided adjacent the ends of the modular channel sections. The arrangement of the parts is such that the U-shaped fastening element lies across the bottom of aligned co-attached channels while the element engages pairs of detent abutments on each channel, but the bottom of the U-shaped fastening element lies across and flush with the end of a single channel which it is to close while engaging in a different manner the pairs of detent abutments associated with that channel.

These and other objects and advantages of the invention will become clear from the following description of a specific example thereof.

In the accompanying drawings:

Figure 1 is an exploded perspective view of a fastening element associated with the ends of two channel members which it is to connect.

Figure 2 is an exploded perspective view of a fastening element associated with the end of a channel element for which it is to serve as the end closure.

Figure 3 is a longitudinal sectional view of the parts shown in Figure 1 in assembled position.

Figure 4 is a longitudinal sectional view of the parts shown in Figure 2 in assembled position.

Figure 5 is a perspective view of a modified form of fastening element between a pair of channels fastenable end to end by the fastening element, Figure 6 is a perspective view of the fastening element shown in Figure 5 adjacent to a channel for forming an end closure therefore, Figure 7 is a sectional side elevation showing the modified channel fastener in position securing a pair of channels end to end, and Figure 8 is a sectional side elevation showing the modified channel fastener in position closing the end of a channel.

As may be seen in Figure 1, the fastening element may comprise a strap, generally indicated at 10, having a central portion 13 and upstanding end portions 12 joined to the center portion along curves or fold lines. Formed in each end portion 12 is a central cut-out 14 and an additional cut-out 15 located toward the fold line from the central cut-out. The central cut-out defines edges or shoulders 19, each of which is spaced the same distance from the edge 20 of the end portion to which it is nearest. The central cut-out also defines an edge or shoulder 18 which, as shown, may be discontinuous. The additional cut-out 15 defines an edge or shoulder 22. The shoulder 18 is spaced from the shoulder 22 the same distance as the shoulders 19 are spaced from their respective associated edges 20. The length of the edges 20 can be the same as the length of the end most edge 21, so that each end portion 12 has a substantially square shape. The edge or shoulder 22 can be spaced from its most adjacent fold line (that is, from the plane of the central portion 13) a distance equal to half the distance between the facing edges or shoulders 19 defined by the central cut-out 14.

Typical channel sections 11, which may utilize the invention, are illustrated in the drawings. The illustrated U-shaped channels are of a common form provided with inwardly extending top flanges 16, which may interengage with cover means (not shown). This general type of channel construction has been found very suitable for housing applications such as the fabrication of housings for fluorescent light fixtures. Facing pairs of abutments or shoulders 17 are provided on the sides of the channels near the ends thereof by lances formed in these sides, as indicated in the drawings.

When the parts are oriented, as shown in Figure 1, and are then assembled, as shown in Figure 3, the facing shoulder 17 on the sides of the channels are engaged by the edges 19 and 20; the edges 21 fit under the top flanges 16. The parts are easily assembled in this position by telescoping them together. When the parts reach the illustrated assembled position, they resiliently snap into engaged and interlocked relation. They may be released either by forcing the end portions of the fastening element toward each other or by forcing the sides of the channel apart during removal of the fastening member 10 from the end of each channel.

When the parts are oriented, as shown in Figure 2, and are then assembled, as shown in Figure 4, the shoulders or abutments 17 are engaged by the edge 18, on the one hand, and the edge 22 on the other. It will be seen that the central portion 13 of the member 10 may be substantially flush with the end of the associated channel to form a neat end closure. Again, the parts are telescoped together to cause them to come into assembled relation, at which time they snap into final interlocked engagement from which they can be released only by forcing the sides of the channel apart or forcing the ends 12 of the member 10 together.

It will be apparent that the above disclosure will suggest modifications which will continue to employ the teaching of the invention. For example, the cut-outs 14 and 15 might not extend through the walls of the side portions 12 but might comprise gouges or sharp depressions in these walls. The term "detent abutment" as used in the following claims, is to be understood as including shoulders or edges such as 18, 19 or 20 and also shoulders formed by gouging, as mentioned above, and other equivalent abutment means.

In accordance with another embodiment of the invention as shown in Figures 5 through 8 of the drawings, a channel fastener 24 is provided for securing a pair of similar opposed and aligned channels 26 and 28 as indicated in Figures 5 and 7 or for closing the end of either of the channnels 26 or 28 as indicated in Figures 6 and 8.

The fastener 24 comprises a flat central portion 30 from the sides of which a pair of end portions 32 and 34 extend from and at substantially 90 degrees to the central portion. The side portions are substantially planar and the dimension between outer flat surfaces of the side portions is slightly less than the spacing between the walls 36, 38 or 40, 42 of channels 26 or 28 respectively, whereby the fastener may be fitted between walls of the channel or a part thereof. Side portions 32 and 34 are also provided with a pair of lateral generally rectangular projections 44, 46 and 48, 50 respectively. Projections 44 and 48 are insertable into rectangular apertures 52 and 54 in the walls 36 and 38 for locking the fastener to the channel 26. In the locked position, central portion 30 lies flat against the bottom 56 of the channel 26 and the side portions 32 and 34 are against the walls 36 and 38 of the channel.

For securing channel 28 in abutment with channel 26 as shown in Figure 7, a pair of opposed, generally rectangular apertures 58 and 60 are provided in the walls 40 and 42 of this channel for receiving the opposed projections 46 and 50 to lock the fastener to the plate. When in locked position with channel 28, central portion 30 lies flat against the bottom 66 of channel 28 and side portions 32 and 34 are flat against the side walls 40 and 42 of the channel.

In assembling or disassembling either channel and the fastener, side portions may be manually distorted inwardly toward each other to provide clearance between the projections 44 through 50 and the channel side walls and the fastener is then inserted sufficiently into the channel so that the projections locking into the respective channel wall are within the channel end. The side portions of the fastener may be released and the projections fitted into the appropriate aperture by sliding the fastener relative to the channel. Elevational alignment between the projections and the appropriate apertures is effected by flanges as shown at 62 and 64 under which the tops of the side portions may be fitted when the bottom of the closure abuts the bottom of the channel.

For assuring electrical continuity between channels such as 26 and 28, the channels are provided with apertures as shown at 70, 72, 74 and 76 alignable with respective apertures 78, 80, 82 and 84 in the closure member for receiving suitable headed, self tapping screws threadedly engaging the walls of the fastener and being in abutment with the channels.

As observed in Figures 6 and 8 the fastener and closure is adaptable as a closure for the channels as shown with respect to channel 28 wherein the fastener and closure is positioned 90 degrees relative to its position in Figures 5 and 7 and projections 44, 46, 48 and 50 are insertable into apertures 86, 88, 90, and 92 to lock the fastener and closure in place as a closure. In this circumstance the outer surface of central portion 30 is in the plane of the end of the channel member. For accommodating the flanges 62 and 64 of the channel, a pair of opposed notches 94 and 96 is provided in the edge of central portion 30 and so spaced from the bottom of the closure to receive the flanges and prevent interference thereby.

Fastener and closure member 24 is provided with a "knock out" 98 to receive a closed nipple which in some circumstances may be employed for hanging the channels from a ceiling.

Having thus described this invention in such full, clear, concise and exact terms as to enable any person skilled in the art to which it pertains to make and use the same, and having set for the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. An end spline and end closure for modular units comprising a strap having two side portions upstanding normally from a central portion, each of said side portions having detent abutments associated with its outwardly facing side and adapted to engage with appropriate detent abutments on a member with respect to which said side portion may be positioned in overlapping relation with said outwardly facing side toward said member, said detent abutments including oppositely facing first and second detent abutments associated with opposite edges of said side portion, a third detent abutment facing opposite to said first detent abutment and spaced a given distance away therefrom along the direction of the width between said opposite edges, a fourth detent abutment facing opposite to said second detent abutment and spaced said given distance away therefrom along said direction of the width, a fifth detent abutment facing away from said central portion of said strap in a second direction normal to said direction of the width, and a sixth detent abutment facing opposite to said fifth detent abutment and spaced said given distance away therefrom along said second direction.

2. A manufacture as defined in claim 1 in which the distance between said sixth abutment and the adjacent end of said central portion is substantially equal to half the distance between said third and fourth detent abutments.

3. An end spline and end closure for modular units comprising a strap having two side portions upstanding normally from a central portion, each side portion comprising a square plate joined at a fold line to said central portion, said plate having first and second edges on its opposite sides and an end edge extending between said first and second edges and being located oppositely from said fold line, a centrally located cut-out in said plate defining a third edge facing opposite to said first edge and spaced a given distance therefrom along a direction parallel to said fold line, said centrally located cut-out defining a fourth edge facing opposite to said second edge and spaced said given distance away therefrom along said parallel direction, said centrally located cut-out defining a fifth edge facing away from said fold line along a direction normal thereto, an additional cutout in said plate located toward said fold line from said central cut-out, said additional cut-out defining a sixth edge facing opposite to said fifth edge and spaced said given distance away therefrom along said normal direction.

4. A manufacture as defined in claim 3 in which the distance between said sixth edge and said fold line is substantially equal to half the distance between said third and fourth edges.

5. A channel fastener and closure comprising a member having a first section and a further pair of sections secured to the ends of said first section and extending substantially perpendicularly thereto, each of said further sections having a first shoulder and a second shoulder in the surface thereof, said first shoulder and one edge of each of said respective sections forming a first pair of shoulders, the second shoulder and a second edge of each of said respective sections forming a second pair of shoulders substantially parallel to said first pair of shoulders, a further pair of shoulders formed in the surface of each of said further sections and being substantially perpendicular to said first and second pair of shoulders, the spacing between the shoulders of each of said pairs of shoulders being substantially equal.

6. A sheet metal channel and end plate spline member unit for a fluorescent lighting fixture comprising a channel having a base and a pair of parallel upstanding flanges, an end plate spline member having a base and a pair of upstanding ears that slide along the flanges of said channel, said channel flanges and said ears having cooperating detent means for mounting said member on the channel as a spline with a portion of the member projecting longitudinally past the end of the channel to connect to another channel, said channel flanges and said ears also having cooperating detent means for mounting said member on the channel so that the base of said member acts as a closure for the end of said channel.

7. A sheet metal channel and end plate spline member unit for a fluorescent lighting fixture comprising a channel member having a base and a pair of parallel upstanding flanges, an end plate spline member having a base and a pair of upstanding ears that slide along the flanges of said channel, said channel member flanges and said ears on said end plate spline member having cooperating detent means for mounting said member on the channel member as a spline with a portion of the member projecting longitudinally past the end of the channel member to connect to another channel member, said detent means including means projecting from one member and means in the other member to accommodate said projecting means, said channel member flanges and said ears on said end plate spline member also having cooperating detent means for mounting said member on the channel member so that the base of said end plate spline member acts as a closure for the end of said channel member, at least one of said projecting detent means on one of said members being accommodate by cooperating detent means on the other member with said end plate spline member disposed in either of its two positions on said channel member.

8. A sheet metal channel and end plate spline member unit for a fluorescent lighting fixture comprising a channel member having a base and a pair of parallel upstanding flanges, an end plate spline member having a base and a pair of upstanding ears that slide along the flanges of said channel, said channel member flanges each having three female detent means and said ears on said end plate spline member each having two cooperating male detent means, one of said female detent means and one of said male detent means on each flange and ear interengaging for mounting said member on the channel member as a spline with a portion of the member projecting longitudinally past the end of the channel member to connect to another channel member, two of said female detent means on each channel member flange and both of said male detent means on each of said ears on said end plate spline member cooperating for mounting said member on the channel member so that the base of said end plate spline member acts as a closure for the end of said channel member and at least one of said male detent means on each ear engages a female detent means on the channel member with said end plate spline member disposed in either of its two positions on said channel member.

References Cited in the file of this patent
UNITED STATES PATENTS 2,112,247    McLoughlin _____ Mar. 29, 1938